United States Patent [19]

Cain et al.

[11] Patent Number: 4,906,388
[45] Date of Patent: Mar. 6, 1990

[54] SEWAGE SLUDGE DEWATERING PROCESS

[75] Inventors: Frank J. Cain, Potomac; Lawrence J. Gasper, Rockville, both of Md.

[73] Assignee: Bechtel Group, Inc., San Francisco, Calif.

[21] Appl. No.: 269,936

[22] Filed: Nov. 9, 1988

[51] Int. Cl.⁴ ..................... B01D 17/00; B01D 17/038
[52] U.S. Cl. ..................... 210/771; 210/774; 210/781; 210/787; 210/804; 210/806
[58] Field of Search ..................... 71/13; 210/702, 710, 210/723, 727, 728, 729, 730, 767, 768, 770, 771, 773, 774, 779–781, 783, 784, 787, 800, 804, 806

[56] References Cited

U.S. PATENT DOCUMENTS 4,065,287 12/1977 Roth ..................... 71/13

Primary Examiner—Frank Sever
Attorney, Agent, or Firm—Townsend & Townsend

[57] ABSTRACT

Solid organic substrates, such as sewage sludge, peat, and biomass, are dewatered in a three-stage process comprising mechanical dewatering of the substrate, followed by combination of the dewatered substrate with an organic solvent, followed by removal of the water-solvent mixture. The dried product is a granular, free-flowing substance suitable for incineration in relatively low-cost equipment. Conveniently, solvent will be recovered from the water-solvent mixture by conventional means, such as distillation, and recycled to the solvent mixing stage.

19 Claims, 1 Drawing Sheet

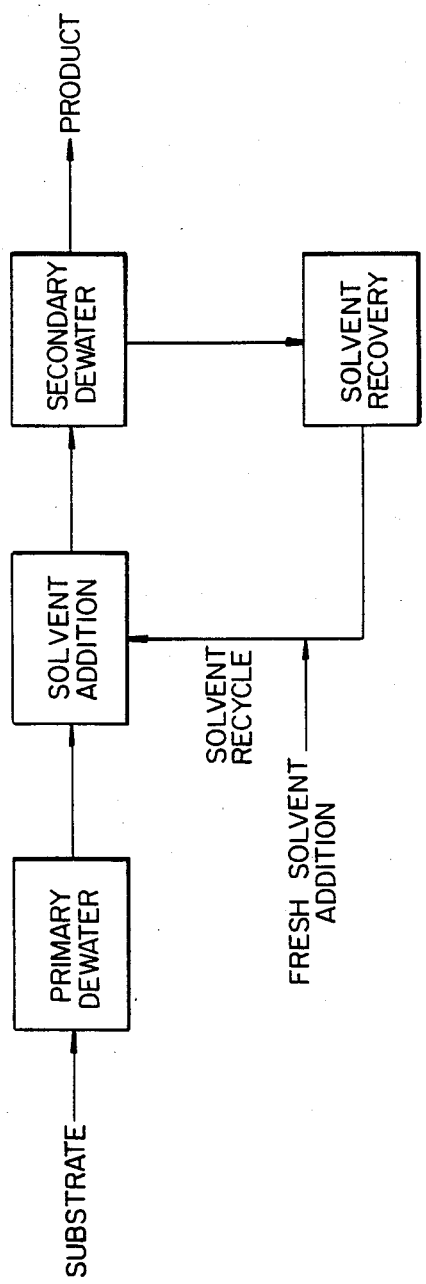
FIG._1.

SEWAGE SLUDGE DEWATERING PROCESS

BACKGROUND OF THE INVENTION

1. Field of the Invention

The present invention relates generally to sewage treatment methods, and more particularly to a method for dewatering primary and secondary sewage sludge prior to incineration or other disposal.

Raw sewage wastes may be treated by a variety of methods, generally classified as primary, secondary, and tertiary, prior to disposal. Primary treatment usually consists of mechanical or gravitational separation of the solid and liquid components of the sewage, resulting in a solid fraction (primary sludge) with a low solids content (typically on the order of 2% to 5% solids, which may be thickened up to about 10% solids by conventional thickeners) and minimal biologic breakdown. Secondary treatment methods usually consist of biological break-down of the organic matter in the sewage to both oxidize the organic matter and inactivate pathogenic microorganisms. The resulting solid fraction (secondary sludge) also has a low solids content (typically 1% to 5% solids which may be thickened to typically 5% to 10% solids by conventional thickeners). Tertiary treatment generally refers to a supplementary treatment of the liquid effluent from a secondary treatment plant to further oxidize the organic materials or detoxify the water, prior to discharge into environmentally sensitive bodies of water. Tertiary treatment methods generally do not produce significant quantities of sludge.

The present invention relates generally to disposal of the sludge produced by the primary and secondary treatment of raw sewage. Millions of tons of such sludge are produced each year by waste water treatment plants in the United States alone. A number of disposal schemes are presently employed for such sludge, including ocean discharge, land fill, use as a fertilizer, and incineration. The present invention is particularly concerned with the incineration of both primary and secondary sewage sludges. Heretofore, incineration has been an effective disposal method, but generally suffers from relatively high capital and operating costs. To reduce operating costs, the sewage sludge is normally dewatered to lessen the amount of fuel required for incineration. The dewatered sludge, however, generally has a very pasty consistency, requiring the use of specially designed furnaces, such as fluidized bed furnaces and multiple hearth furnaces for incineration. It would therefore be desirable to provide improved methods for dewatering the sewage sludge which provides for both the highly effective removal of water (to reduce operating costs) and provide for a sludge which has an improved consistency which allows for incineration in conventional furnaces (to reduce capital costs).

2. Description of the Background Art

U.S. Pat. Nos. 4,397,100 and 4,339,882, each disclose methods for dewatering organic substrates, such as sewage sludge, by contacting the substrate with a first solvent, such as a short chain alcohol, followed by contacting with a second solvent, such as a long chain alcohol. The first solvent is miscible with the water, while the second solvent is miscible with the first solvent, but not the water. In this way, water may be extracted from the organic substrate and the first solvent thereafter recovered by the second solvent. A system must be provided for separating the solvents so that they can be recycled. U.S. Pat. No. 4,014,104, discloses a method for drying coal comprising introducing a solvent, such as methanol which displaces the water and is thereafter more readily dried from the coal. The solvent is recovered by an unspecified solvent recovery system. The following U.S. patents disclose sewage dewatering systems which do not employ solvent displacement: U.S. Pat. Nos. 4,717,484; 4,659,422; 4,500,428; 4,402,834; 4,377,486; 2,349,390; and 1,543,939.

SUMMARY OF THE INVENTION

An organic substrate, typically sludge resulting from either primary or secondary sewage treatment, is dewatered in a three-stage treatment process which effectively reduces the water content and provides a product having an improved consistency for incineration. The first stage comprises the mechanical dewatering of the sludge, typically by mechanical thickening followed by a mechanical press or centrifuge, to reduce the moisture content to below about 90% by weight. The substrate is then mixed with an organic solvent miscible with water at a weight ratio in the range from about 1:1 to 5:1 (solvent:free water in the substrate). In the final process step, the mixture of water and solvent is mechanically removed from the substrate, typically by a mechanical press screen or centrifuge. The final dewatered product of the process will have a moisture content below about 75% by weight, typically being below about 70% by weight, and frequently being below about 65% by weight.

Surprisingly, it has been found that the three-step process of the present invention results in a granularization of the solid substrate, providing a substantially dry, free-flowing product which may be conveniently incinerated in conventional furnaces designed for combusting such substances. The need to employ costly fluidized bed combustors and multiple hearth furnaces is thus eliminated.

BRIEF DESCRIPTION OF THE DRAWINGS

FIG. 1 is a block diagram illustrating the process flow according to the method of the present invention.

DESCRIPTION OF THE SPECIFIC EMBODIMENTS

Organic substrates which may be treated by the method of the present invention include virtually all such substrates which have a relatively high moisture content and which are intended for combustion or incineration, either for disposal or to provide energy. Exemplary organic substrates which are utilized for providing energy include peat, coal, and biomass sources. Substrates intended for disposal will include both domestic and industrial sewage. Domestic sewage usually includes a variety of organic substances, including human excrement, waste oils, greases, and animal and vegetable matter. Industrial sewage suitable for treatment by the present invention will generally have a high organic content, such as the sewage from pulp mills and breweries. The water content of the organic substrate may vary widely, typically being from about 80% to >99% moisture, usually being from 90% to >99% moisture, and more usually being in the range from about 95% to >99% moisture.

Referring now to FIG. 1, the organic substrate will initially be fed to a primary dewatering stage. The primary dewatering stage will comprise a mechanical dewatering system, typically a thickener followed by a belt filter press, a plate and frame filter press, a centrifuge, vacuum filter or the like. The use of belt filter press or plate and frame filter presses is preferred as they generally provide the driest sludge cake. The moisture content of the sludge cake after primary dewatering should be lowered to the greatest extent possible, typically being lowered to below about 85% moisture by weight, more typically being lowered to below about 80% moisture by weight, and preferably being lowered to below about 75% moisture by weight. Moisture content is defined as the percentage of water by weight present in the organic substrate at that point in the process.

After the primary dewatering stage, the sludge cake is transferred to a single or multi-stage mixing system where it is combined with a suitable organic solvent, as described in more detail hereinbelow. The mixing system will normally be an agitated tank or series of agitated tanks operated in either a continuous or batch mode.

The amount of organic solvent added will depend on the level of residual moisture in the sludge cake entering the solvent addition stage and the type of organic solvent employed. Generally, the organic solvent will be added in a ratio from about 1:1 to 5:1 (organic solvent:-free water) by weight, usually being in the range from about 2:1 to 4:1. The optimum ratio of solvent to free water is that which will cause granularization of the dewatered sludge, and will vary within the aforementioned ranges for particular organic solvents.

Suitable organic solvents include low molecular weight monohydric alcohols, such as methanol, ethanol, propanol, butanol, and isomers thereof; ketones, such as acetone; organic acids, such as acetic acid; and glycols, such as ethylene glycol. The organic solvents are selected to be miscible with water and to provide the desired granularization of the dewatered organic substrate. In the preferred embodiments, methanol is mixed with the dewatered organic substrate at a ratio of about 3:1 (methanol:free water) by weight or ethanol is mixed with the dewatered organic substrate at a ratio of about 2:1 (ethanol:free water) by weight.

After combination with the desired organic solvent, the solvent-organic substrate mixture is transferred to the secondary dewatering state, where the liquid mixture is mechanically separated from the organic substrate, leaving the final dewatered product. Suitable mechanical separation systems include both mechanical presses, such as belt filter presses and plate and frame filter presses, screens and centrifugation. Again, the plate and frame filter presses will generally provide the driest product. The product so produced will be a granular, free-flowing product suitable for incineration in conventional furnaces, such as semi-suspension or mass burn furnaces. The moisture content of the final product will be below about 75% by weight, typically being below about 70% by weight, and frequently being below about 65% by weight.

The organic solvent will generally be recovered from the water-solvent mixture by conventional liquid-liquid separation systems, such as distillation. The recovered solvent may then be recycled to the solvent mixing stage of the process.

The dried, granular product may be incinerated in relatively low cost combustion equipment, such as a semi-suspension furnace or a mass burn furnace, and the heat generated used to provide an energy source. Conveniently, the product may be combined with other combustible materials to provide a combined fuel source useful for generating large amounts of energy. In the case of sewage treatment, the energy produced may be utilized to help operate the treatment facility.

The following examples are offered by way of illustration, not by way of limitation.

EXPERIMENTAL

Dewatered digested sewage sludge was obtained from an operational sewage sludge processing facility. Fresh sludge was obtained for each experiment.

The following test protocol was employed. Approximately 15 g of sludge, dewatered to 80% to 81% moisture content was added to a 600 ml beaker. Anhydrous alcohol, either denatured ethanol alcohol (90% ethanol, 5% methanol, and 5% isopropanol) or methanol, was next weighed into the beaker, and optionally water was also weighed into the beaker. The sludge and alcohol were then mixed for approximately 25 minutes, and the mixture then transferred to a Buchner funnel. The water was then separated by applying a vacuum to the funnel for a period ten minutes longer than required to pull all of the free water through the sludge cake. After weighing the dewatered sludge, a sample of the sludge was transferred to a weighing dish and weighed. After drying overnight at 117° C., the sample was again weighed. The results of the various tests are set forth as follows.

In Test 1, 1.065 g of water was added per gram of sludge, with no alcohol being added. After addition of water, the sludge had a pasty consistency and was difficult to dewater. The dewatered sludge had a pasty consistency similar to the raw sludge.

In Test 2, 1.830 g of the denatured ethanol was added per gram of sludge, without the addition of water. The sludge broke up into discrete particles on the order of 1 mm in diameter immediately after the alcohol was stirred in. The sludge solids settled readily in the alcohol solution and the liquid formed a clear (non-hazy) supernatant with some suspended solids (particles of visible size and shape). The appearance of the sludge in solution did not change in the 25 minute mixing period. The sludge dewatered very easily due to the granular nature of the sludge. The dewatered sludge appeared to be dry on the surface and was a free-flowing solid. The filtrate was a clear yellow-brown liquid. When water was added to the filtrate for rinsing, the solution foamed and became hazy.

In Test 3, 0.914 g of denatured ethanol was added gram of sludge. The sludge was pasty, but had a more granular consistency than in Test 1. The sludge was difficult to dewater, and the dewatered sludge was similar to Test 1. The alcohol removed from the sludge evaporated as it was drawn into the Buchner funnel.

In Test 4, 0.284 g of denatured ethanol was added per gram of sludge. The alcohol sludge mixture formed a heavy paste which could not be filtered. The test was terminated and no additional data was obtained.

In Test 5, 0.867 g of water and 0.607 g of denatured ethanol were added per gram of sludge. The sludge-water-alcohol mixture was a thin paste which was difficult to dewater. The dewatered sludge was pasty like observed in Test 1.

In Test 6, 1.228 g of denatured ethanol was added per gram of sludge. The sludge broke up into discrete particles similar to Test 2. The initial dewatering rate was much faster than in Test 1, but slower than in Test 2. The total dewatering time was similar to Test 1, but the dewatered sludge, although granular in appearance, was not as granular or as dry as in Test 2.

In Test 7, 2.662 g of methanol was added per gram of sludge. The sludge broke up into discrete particles immediately after the alcohol was added. The supernatant was cloudy after combining with alcohol in contrast to the clear supernatant of Test 2. The sludge dewatered quickly, but not as quickly as in Test 2. The lengthy dewatering time was due in part to a poor distribution of sludge solids on the filter. The dewatered sludge was granular in appearance, but more sticky and less free-flowing than in Test 2. The filtrate became more cloudy and foamed when water was added to rinse the funnel.

In Test 8, 0.876 g of methanol was added per gram of sludge. The sludge alcohol mixture was too pasty to filter, so the test was terminated and no data collected.

In Test 9, 1.470 g of methanol was added per gram of sludge. The sludge alcohol mixture and dewatered sludge were pasty. The sludge was difficult to dewater.

In Test 10, 1.322 g of water and 5.201 g of methanol were added per gram of sludge. The sludge broke up in discrete particles similar to those observed in Test 2. Immediately upon mixing, the supernatant and the filtrate were more cloudy than when ethanol was used. The filtration rate was rapid, but not as rapid as with ethanol. The relatively long filtration time was partially due to the large volume of liquid which was removed from the sludge. The dewatered sludge was intermediate between granular and pasty. The filtrate foamed when the funnel was rinsed with water.

In Test 11, 1.427 g of water and 5.613 g of denatured ethanol were added per gram of sludge. The sludge reacted to the ethanol water mixture in the same manner as in Test 2. The sludge broke up into discrete particles on mixing, and a clear supernatant and filtrate were produced. The sludge dewatered very quickly due to its granular nature. The surface of the dewatered sludge appeared to be dry and the sludge granules were a free-flowing solid. The addition of water to the filtrate caused foaming, and the solution became cloudy in appearance.

In Test 12, 1.400 g of water and 4.097 g of dentured ethanol were added pr gram of sludge. The sludge broke up on addition of the ethanol and water in a manner similar to Test 2. The sludge settled readily and formed a clear supernatant and filtrate. The filtration rate was much slower than in Test 2 and 11 but still relatively fast in view of the volume of liquid. The dewatered sludge was a granular, dry, free-flowing solid. The filtrate foamed and became cloudy on addition of water. Based on these tests, it appears that the addition of low-weight organic solvents, such as ethanol and methanol, can significantly improve the dewaterability of digested sewage sludge. Ethanol appears to be the most effective dewatering aid of the solvents tested.

The results of the various tests are summarized in Table 1.

TABLE 1

| Test No.[1] | 1 | 2 | 3 | 5 | 6 | 7 | 9 | 10 | 11 | 12 |
|---|---|---|---|---|---|---|---|---|---|---|
| Alcohol Type | Ethyl | Ethyl | Ethyl | Ethyl | Ethyl | Methyl | Methyl | Methyl | Ethyl | Ethyl |
| Alcohol (g) | 0 | 29.1 | 14.9 | 9.1 | 19.4 | 41.8 | 24.4 | 77.5 | 84.2 | 59.4 |
| Water (g) | 16.5 | 0 | 0 | 13.0 | 0 | 0 | 0 | 19.7 | 21.4 | 20.3 |
| Raw Sludge (g) | 15.5 | 15.9 | 16.3 | 15.0 | 15.8 | 15.7 | 16.6 | 14.9 | 15.0 | 14.5 |
| Sludge Solids (%) | 19.7 | 19.7 | 19.7 | 19.7 | 19.7 | 19.2 | 19.2 | 19.2 | 19.2 | 19.2 |
| Dewatered Solids (%) | 25.0 | 33.0 | 22.3 | 20.1 | 26.6 | 32.2 | 25.4 | 29.6 | 30.5 | 31.2 |
| Dry Sludge (g) | 3.05 | 3.13 | 3.21 | 2.96 | 3.11 | 3.01 | 3.19 | 2.86 | 2.88 | 2.78 |
| Water in Raw Sludge (g) | 12.45 | 12.77 | 13.09 | 12.04 | 12.69 | 12.69 | 13.41 | 12.04 | 12.12 | 11.78 |
| Water in Dry Sludge (g) | 9.15 | 6.13 | 11.18 | 11.77 | 8.58 | 6.34 | 9.37 | 6.80 | 6.56 | 6.13 |
| Water Removed[2] | 3.30 | 7.45 | 5.80 | 2.43 | 6.63 | 7.42 | 7.05 | 6.71 | 6.84 | 6.62 |
| Alcohol in Dewatered Sludge[2] | 10 | 0.81 | 3.89 | 2.16 | 2.52 | 1.07 | 3.01 | 1.47 | 1.28 | 0.97 |
| Alcohol in Filtrate | 0 | 28.29 | 11.01 | 6.94 | 16.88 | 40.73 | 21.39 | 76.03 | 82.92 | 58.43 |
| Water in Filtrate | 19.8 | 7.45 | 5.80 | 15.43 | 6.63 | 7.42 | 7.05 | 26.41 | 28.24 | 26.92 |
| Alcohol in Filtrate[2] | 0 | 79.2 | 65.5 | 31.0 | 71.8 | 84.6 | 75.2 | 74.2 | 74.6 | 68.5 |
| Water Added/ Wet Sludge | 1.065 | 0 | 0 | 0.867 | 0 | 0 | 0 | 1.322 | 1.427 | 1.400 |
| Alcohol/Wet Sludge | 0 | 1.830 | 0.914 | 0.607 | 1.228 | 2.662 | 1.470 | 5.201 | 5.613 | 4.097 |
| Water from Raw Sludge | 26.5 | 58.3 | 44.3 | 20.2 | 52.2 | 58.5 | 52.6 | 55.7 | 56.4 | 56.2 |

[1] No data for Test Nos. 4 and 8.
[2] Assumes sludge moisture is bound and alcohol is well mixed with surface water.

Although the foregoing invention has been described in some detail by way of illustration and example for purposes of clarity of understanding, it will be obvious that certain changes and modifications may be practiced within the scope of the appended claims.

What is claimed is:

1. A method for dewatering an organic substrate, said method comprising providing a substantially dry, free-flowing product having properties which enable it to be conveniently incinerated in conventional furnaces other than only fluidized bad combustors and multiple hearth furnaces, by:

mechanically reducing the moisture content of the organic substrate to below about 90% by weight;
  mixing the organic substrate having reduced moisture content with a low molecular weight organic solvent where the weight ratio of solvent to organic substrate is in the range from about 1:1 to 5:1; and mechanically removing the water-solvent mixture from the organic substrate.

2. A method as in claim 1, wherein the moisture in the substrate is initially reduced by a mechanical press, a centrifuge or a vacuum filter.

3. A method as in claim 1, wherein the low molecular weight organic solvent is selected from the group consisting of alcohols, ketones, organic acids, and glycols.

4. A method as in claim 3, wherein the low molecular weight solvent is an alcohol selected from the group consisting of methanol, ethanol, propanol, butanol, and isomers thereof.

5. A method as in claim 1, wherein the water solvent mixture is removed from the substrate by a mechanical press or a screen.

6. A method as in claim 1, wherein the organic substrate is primary or secondary sewage sludge.

7. A method as in claim 1, further comprising recovering the solvent from the water-solvent mixture which has been mechanically removed from the substrate.

8. A method as in claim 7, wherein the solvent is recovered by distillation.

9. A method as in claim 8, wherein the energy used for distillation is obtained from a substrate combustion system of a steam generation system.

10. A method as in claim 1, wherein the organic substrate is selected from the group consisting of peat, coal, sewage sludge and biomass.

11. A method for dewatering an organic substrate, said method comprising providing a substantially dry, free-flowing product having properties which enable it to be conveniently incinerated in conventional furnaces other than only fluidized bed combustors and multiple hearth furnaces, by:

mechanically reducing the moisture content of the organic substrate to below about 90% by weight;

mixing the organic substrate having reduced moisture content with a low molecular weight organic solvent where the weight ratio of solvent to organic substrate is in the range from about 1:1 to 5:1; and mechanically removing the water-solvent mixture from the organic substrate.

12. A method as in claim 11, wherein the moisture in the substrate is initially reduced by a mechanically press, a centrifuge, or a vacuum filter.

13. A method as in claim 11, wherein the low molecular weight organic solvent is selected from the group consisting of alcohols, ketones, organic acids, and glycols.

14. A method as in claim 13, wherein the low molecular weight solvent is an alcohol selected from the group consisting of methanol, ethanol, propanol, butanol, and isomers thereof.

15. A method as in claim 11, wherein the water solvent mixture is removed from the substrate by a mechanical press or a screen.

16. A method as in claim 11, wherein the organic substrate is primary or secondary sewage sludge.

17. A method as in claim 11, further comprising recovering the solvent from the water-solvent mixture which has been mechanically removed from the substrate.

18. A method as in claim 17, wherein the solvent is recovered by distillation.

19. A method as in claim 18, wherein the energy used for distillation is obtained from a substrate combustion system of a steam generation system.

* * * * *